United States Patent
Hohmann et al.

(10) Patent No.: US 10,814,443 B2
(45) Date of Patent: Oct. 27, 2020

(54) CLAMPING DEVICE FOR STRETCHING A THREADED BOLT

(71) Applicants: Jörg Hohmann, Meschede (DE); Frank Hohmann, Warstein (DE)

(72) Inventors: Jörg Hohmann, Meschede (DE); Frank Hohmann, Warstein (DE)

( * ) Notice: Subject to any disclaimer, the term of this patent is extended or adjusted under 35 U.S.C. 154(b) by 198 days.

(21) Appl. No.: 15/651,168

(22) Filed: Jul. 17, 2017

(65) Prior Publication Data

US 2018/0015577 A1  Jan. 18, 2018

(30) Foreign Application Priority Data

Jul. 18, 2016 (DE) .................. 10 2016 113 196

(51) Int. Cl.
| | | |
|---|---|---|
| B23P 19/06 | (2006.01) | |
| B25B 29/02 | (2006.01) | |
| G01B 21/02 | (2006.01) | |
| G01B 21/16 | (2006.01) | |

(52) U.S. Cl.
CPC ............ B23P 19/067 (2013.01); B25B 29/02 (2013.01); G01B 21/02 (2013.01); G01B 21/16 (2013.01)

(58) Field of Classification Search
CPC ....... B23P 19/067; B25B 29/02; G01B 21/02; G01B 21/16; B01B 21/16
See application file for complete search history.

(56) References Cited

U.S. PATENT DOCUMENTS

| | | |
|---|---|---|
| 5,452,629 A | 9/1995 | Heiermann et al. |
| 7,469,592 B2 | 12/2008 | Hohmann et al. |
| 2008/0173140 A1* | 7/2008 | Hohmann ............. B23P 19/067 81/57.44 |
| 2014/0245868 A1* | 9/2014 | Wagner .................. B25B 29/02 81/57.38 |

* cited by examiner

*Primary Examiner* — David B. Thomas
*Assistant Examiner* — Aaron R McConnell
(74) *Attorney, Agent, or Firm* — Gudrun E. Huckett

(57) ABSTRACT

A clamping device for stretching a threaded bolt by pulling on its threaded end section has a support tube surrounding the threaded end section, a cylinder disposed in extension of the support tube, a piston axially movable therein, a changeover bush to be screwed onto the threaded end section and carried along axially by the piston, a hydraulic device for the piston, and a signal link between hydraulic device and a device for detecting the extent of the thread engagement between the changeover bush and the threaded end section. A contactless measurement of the thread engagement between changeover bush and bolt to be clamped for measuring the thread engagement is provided in that the device for detecting the extent of the thread engagement includes a sensor element fastened on the changeover bush, which is positioned axially opposite the end face of the threaded bolt with axial separation.

13 Claims, 3 Drawing Sheets

CLAMPING DEVICE FOR STRETCHING A THREADED BOLT

BACKGROUND OF THE INVENTION

The invention relates to a clamping device for stretching a threaded bolt by pulling on its threaded end section, said clamping device comprising a support tube surrounding the threaded end section, a cylinder which is disposed in extension of the support tube and comprises at least one piston which is axially movable therein by means of hydraulic forces, a changeover bush which can be screwed together with the threaded end section and is designed to be carried along axially by the piston, a hydraulic device for the hydraulic supply of the piston, and a signal link between the hydraulic device and a device for detecting the extent of the thread engagement between the changeover bush and the threaded end section.

Clamping devices for stretching threaded bolts are known from the prior art. The clamping device disclosed in U.S. Pat. No. 5,452,629 comprises a measuring arrangement for determining the tensile stress. The measuring arrangement essentially consists of measuring rods which are arranged in a row, are in contact with the threaded end section of the bolt to be clamped, and continue in the vertical direction along the changeover bush. The lowermost measuring rod, which is in contact with the threaded bolt, is connected to a second measuring rod. The second measuring rod has a radial expansion, against which a spring bears and preloads the measuring arrangement in the direction of the bolt. Located on the upper end of the measuring arrangement, in direct proximity to the measuring rods, is a sensor in the form of a linear potentiometer, an inductive sensor, or an optoelectronic sensor. A tube or a sleeve surrounding the measuring rods guides a cable up to the upper end of the clamping device. The variation of the electrical resistance is detected and is proportional to the tensile stress. This can be represented on a display unit connected to the cable. The supply of the cylinder or the piston device with hydraulic fluid can be controlled via the tensile stress determined in this way.

US 2014/0245868 A1 describes a clamping device, in the case of which a measuring rod is seated, via its lower end, on the end face of the threaded bolt to be clamped. The rod is longitudinally displaceable with respect to the changeover bush surrounding the bolt, which is easily seen from the outside. In this way, it is possible to visually check whether the depth of engagement of the bolt into the changeover bush is sufficient.

U.S. Pat. No. 7,469,592 B2 describes an embodiment in which it is not the relative displacement of a measuring rod that is detected, but rather the distance between the bolt and a sensor element which is spaced apart from the bolt but is fixed in position. The changeover bush is displaceable relative to the sensor element. Therefore, a distance between the sensor element and the bolt relative to the changeover bush is detected.

The measuring arrangements known from the prior art for measuring the tensile stress or the measurement parameters that are proportional to the tensile stress are based on the relative displacement between the changeover bush and the measuring instrument. Such a design requires a relatively large amount of design work since it requires an exact match between the bolt, the measuring arrangement, and the changeover bush. For this purpose, the measuring arrangement must be guided or mounted so as to slide within the clamping device. In addition, the measuring arrangement must be fastened on at least one side outside the changeover bush in order to prevent it from sliding along with the changeover bush. Moreover, the sensor must be mechanically stable or must be protected in another way against external mechanical loads. This results in a considerable amount of design work.

In the case of the clamping devices known from the prior art, which comprise sensor arrangements having direct contact with the bolt to be clamped, the sensor may be subjected to high mechanical loads. One aspect shared by all these devices is that the tensile stress can be calculated from the measurement data, but the thread engagement cannot be directly calculated in this way.

The problem addressed by the invention is that of providing a clamping device for stretching a threaded bolt by pulling on its threaded end section, which allows for a contactless measurement of the extent of the thread engagement between the changeover bush and the bolt to be clamped. In addition, such a clamping device is to measure the thread engagement precisely, in a way that is gentle on material, and with increased operational reliability.

SUMMARY OF THE INVENTION

In order to solve this problem, a clamping device for stretching a threaded bolt is provided that comprises a support tube surrounding the threaded end section, a cylinder which is disposed in extension of the support tube and comprises at least one piston which is axially movable therein by means of hydraulic forces, a changeover bush which can be screwed together with the threaded end section and is designed to be carried along axially by the piston, a hydraulic device for the hydraulic supply of the piston, and a signal link between the hydraulic device and a device for detecting the extent of the thread engagement between the changeover bush and the threaded end section, wherein the device for detecting the extent of the thread engagement includes a sensor element fastened on the changeover bush, which is positioned axially opposite the end face of the threaded bolt with axial separation.

In the case of such a clamping device, the threaded end section of the threaded bolt to be clamped and to be stretched is surrounded by a support tube of the clamping device. A cylinder is disposed in extension of the support tube and is provided with at least one piston which is axially movable within the cylinder by means of hydraulic forces. The hydraulic supply of the piston is carried out via a hydraulic device. During its axial and vertical movements, the piston axially carries along a changeover bush which can be screwed together with the threaded end section. A further component of the clamping device is a device for detecting the thread engagement between the changeover bush and the threaded end section of the threaded bolt, said device being connected via a signal link to the hydraulic device or a hydraulic control unit.

According to the invention, a component of the device for detecting the extent of the thread engagement is a sensor element which is fastened on the changeover bush and is positioned opposite the end face of the threaded bolt with axial separation, i.e., contactlessly. It is advantageous that the sensor element is not in contact with the threaded bolt in any operating state. Therefore, mechanical loads on the sensor element caused by impact or shock loads are avoided. Due to the positionally fixed arrangement of the sensor element on the changeover bush, the length of the thread engagement can be determined directly and precisely when the position of the sensor is known, the distance between the sensor and the lower end of the changeover bush is known, and on the basis of the measured separation.

The sensor element can be an optical, acoustic, magnetic, electrical, electromagnetic, optoelectrical, inductive, low-frequency or high-frequency sensor. A combination of one or more of the aforementioned sensor elements with other measuring methods, for example a mechanical contact measurement, is also conceivable. For example, the contact measurement known from the prior art can be combined with a contactless measurement via measuring pins connected to the bolt. In such a design, the measuring pin and the contactless sensor would be adjacent to each other. Such a design would make it possible to measure the thread engagement and the tensile stress simultaneously.

A contact-free measuring arrangement is advantageous and has a simpler design. The aforementioned sensor elements allow for a contactless and highly precise measurement of the distance between the end face of the threaded bolt and the sensor. Since the distance between the lower end of the changeover bush and the sensor element is a fixed value, the thread engagement, i.e., the length of the engagement of the changeover bush with the threaded bolt, can be calculated by subtracting the measured distance of the thread engagement.

In one preferred embodiment of the invention, the sensor element is disposed on an inner side of the changeover bush, which is axially opposite the end face of the threaded bolt. As a result, the position coordinates of the sensor element are unequivocally and constantly established. The distance between the sensor element and the end face of the threaded bolt can be measured precisely and without a mechanical load on the sensor element.

It is advantageous when the sensor element is connected to a hydraulic control unit of the hydraulic device via a signal link. As a result, the distance (or a measured value that is proportional to the distance) that is determined or registered by the sensor element can be forwarded to the hydraulic control unit. This makes it possible to match commands output by the hydraulic control unit of the hydraulic device to the values detected by the sensor element. It is therefore possible that the hydraulic device communicates with the sensor element via the signal link, and both components are optimized in terms of their interaction. A functional coupling of the two components is ensured.

In yet another embodiment of the invention, the sensor element is connected to the hydraulic control unit of the hydraulic device via a wireless signal link. This allows for the contactless data transmission to the hydraulic control unit. As a result, the number of components is reduced and the design is simplified.

Alternatively, the sensor element is connected to the hydraulic control unit of the hydraulic device via a signal cable. The cable is routed along a longitudinal channel extending in the changeover bush and transmits the data, which were registered by the sensor element, to the hydraulic control unit. Direct contact between the sensor element and the threaded bolt can be dispensed with in this embodiment as well, which is advantageous for the durability of the sensor element. In such an embodiment, the sensor element is also fixedly connected to the changeover bush.

The longitudinal channel accommodating the cable can be disposed either on the central axis of the changeover bush or offset with respect to this central axis.

In yet another advantageous embodiment of the invention, the hydraulic control unit is designed in such a way that the hydraulic device is not released to build up pressure until a certain minimum thread engagement length has been reached. Therefore, once a value for the minimum thread engagement length—which has been predefined by the user or has been automatically predefined—has been reached, it becomes possible to pump hydraulic fluid into the piston-cylinder unit and place the changeover bush under tensile force. Such a device is used for safety, in particular, and reduces the risk of the changeover bush breaking loose or sliding off the threaded bolt if the thread engagement is insufficient. In addition, such a design simplifies the operation of the clamping device in such a way that it allows for a fully automatic operation of the clamping device without active engagement by a person. The hydraulic device is controlled according to the thread engagement that is actually present. Increased operational reliability is achieved as a result. One reason therefor is that errors in measurement resulting from human involvement are nearly entirely ruled out.

In yet another advantageous embodiment of the invention, the sensor element is disposed on a sensor housing which, in turn, is provided with a threaded projection. This threaded projection is screwed into a corresponding thread receptacle of the changeover bush. The sensor element or the sensor element fastened on the sensor housing can therefore be securely connected to the changeover bush in a simple way. This embodiment also simplifies the design according to the invention and simultaneously increases the operational reliability.

It is also advantageous when the hydraulic control unit is provided with visual display means. These means display, for example, the measured thread engagement and the minimum thread engagement length. Alternatively or additionally, it is possible to display or acoustically signal whether the thread engagement that has been achieved is sufficient.

Other parameters can also be represented with the aid of the visual means, such as, for example, representing the tensile stress as an actual value or a setpoint value, or the hydraulic pressure. As a result, the user of the clamping device according to the invention is enabled to recognize the signal values or measured values output by the hydraulic control unit, to correct these, if necessary, and to control the operation of the clamping device according thereto. An automatic detection, correction, and control is also possible, however.

In yet another embodiment of the invention, a measuring pin which is in contact with the end face of the threaded bolt and is axially movable in the longitudinal direction of the changeover bush can be disposed next to the sensor element fastened on the changeover bush. Said measuring pin can be disposed in a channel extending along the changeover bush, wherein the changeover bush and the measuring pin are displaceable relative to each other. The tensile stress and/or the extent of the thread engagement can be measured or controlled by means of the measuring pin.

BRIEF DESCRIPTION OF THE DRAWINGS

Further details and advantages of the invention result from the following description of the associated drawings, in which exemplary embodiments of the clamping device according to the invention are represented.

DESCRIPTION OF PREFERRED EMBODIMENTS

The clamping device according to the invention is used for tightening, re-tightening, or even loosening threaded connections, in particular threaded connections in which a threaded bolt 7 has been clamped via a nut 9 against another machine part 21.

During operation, the clamping device can exert a preload force onto the threaded bolt 7. This is referred to synonymously as pulling on the threaded bolt 7 or stretching the threaded bolt 7. During this preloading, the nut 9 screwed onto the threaded bolt 7 can be tightened, re-tightened, or loosened, if necessary.

Figure 1:
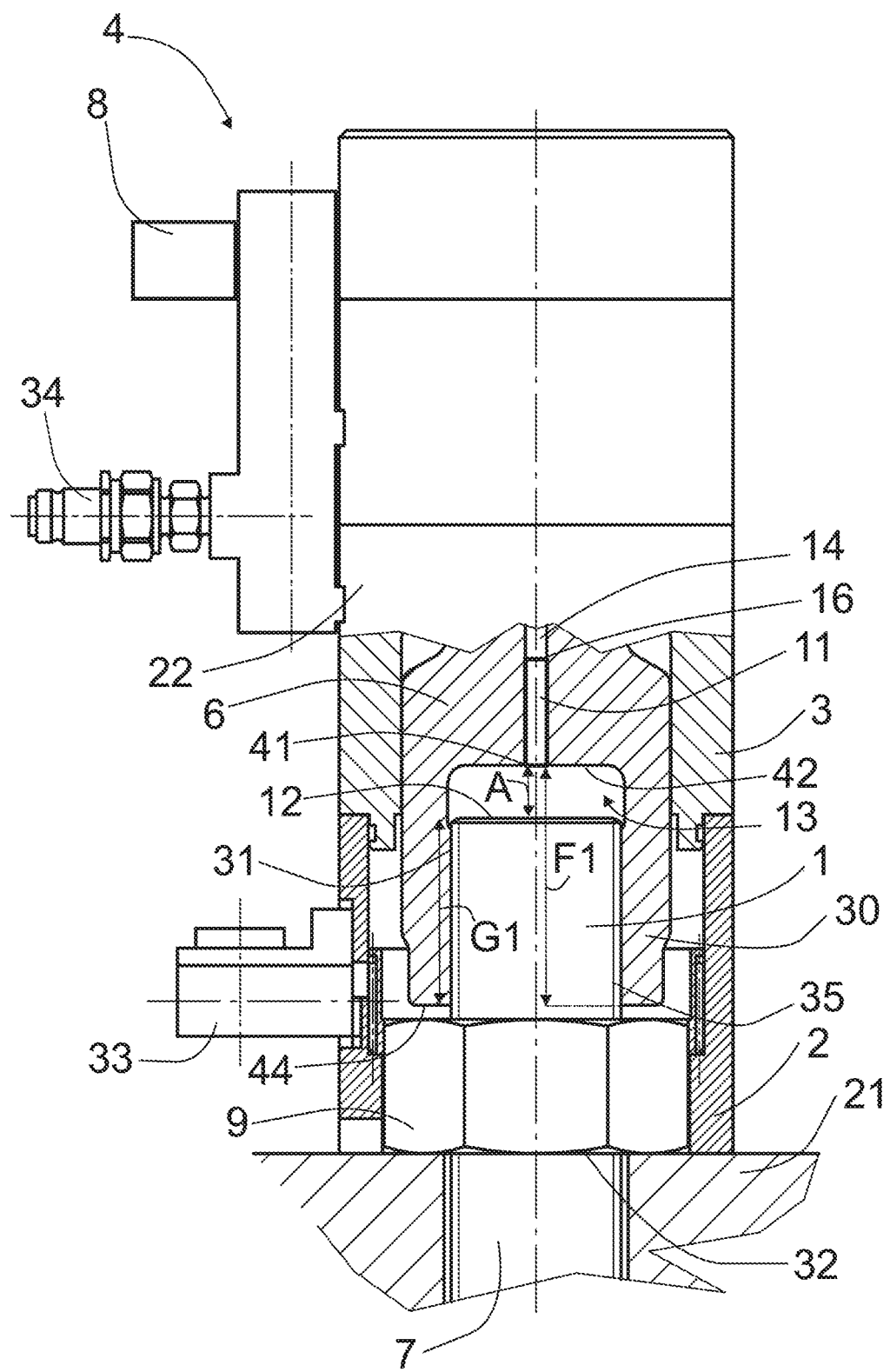
FIG. 1 shows a simplified sectional representation of a clamping device for stretching a threaded bolt, which is aligned with the threaded bolt and bears against an abutment.
Figure 2:
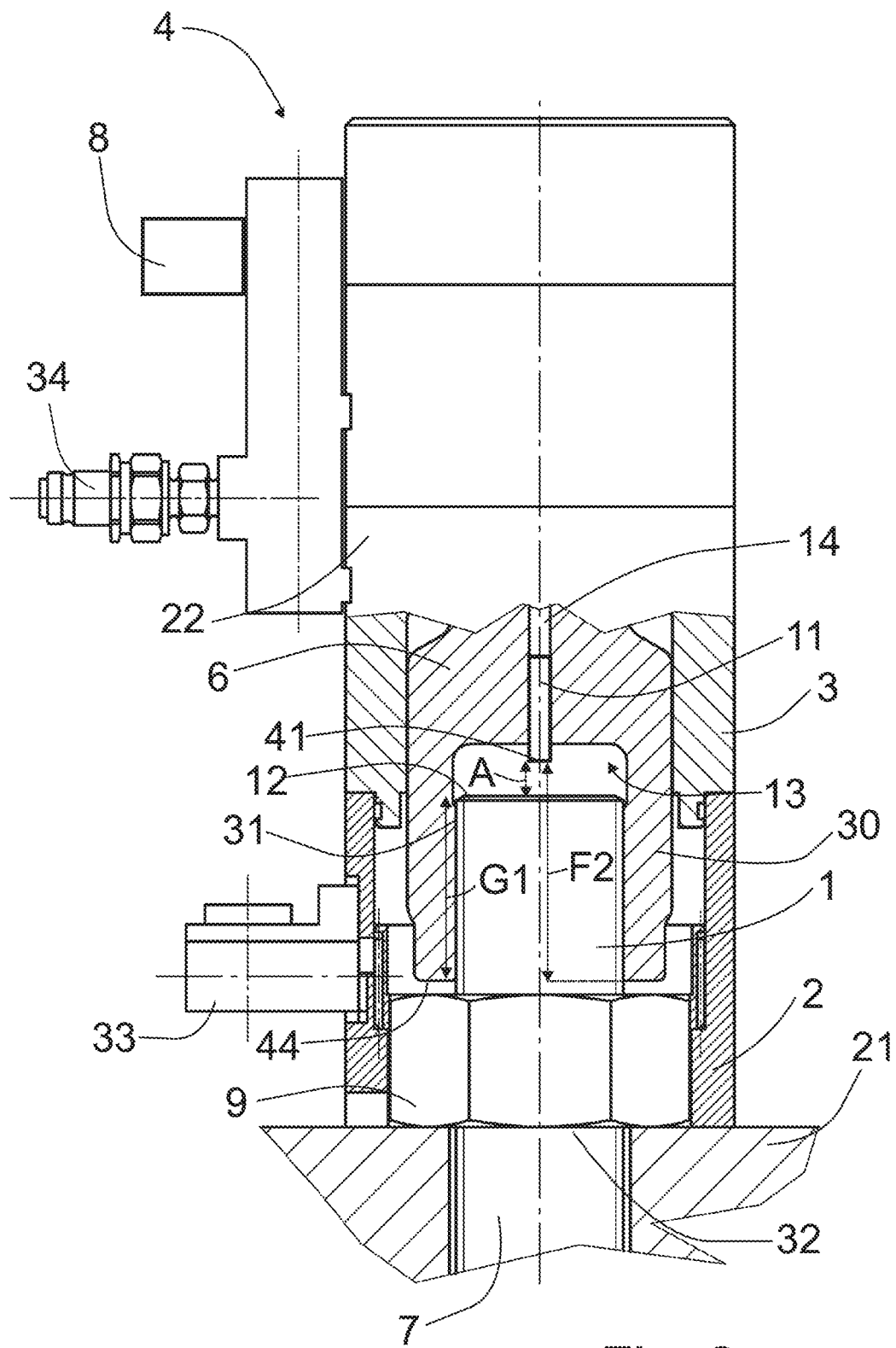
FIG. 2 shows a second embodiment of a clamping device for stretching a threaded bolt, in the same installation situation as in FIG. 1.

A clamping device according to the invention is shown in the installation position in two different embodiments in FIGS. 1 and 2. The two embodiments are identical with respect to their essential components.

A central component of the clamping device is a changeover bush 6 which is surrounded in part by a support tube 2 and in part by a cylinder 3. At its one end, the changeover bush 6 is designed to be at least partially open or as a type of sleeve in the direction of the threaded bolt 7. The sleeve-type section 30 of the changeover bush 6 is provided internally with an internal thread 31.

Figure 3:
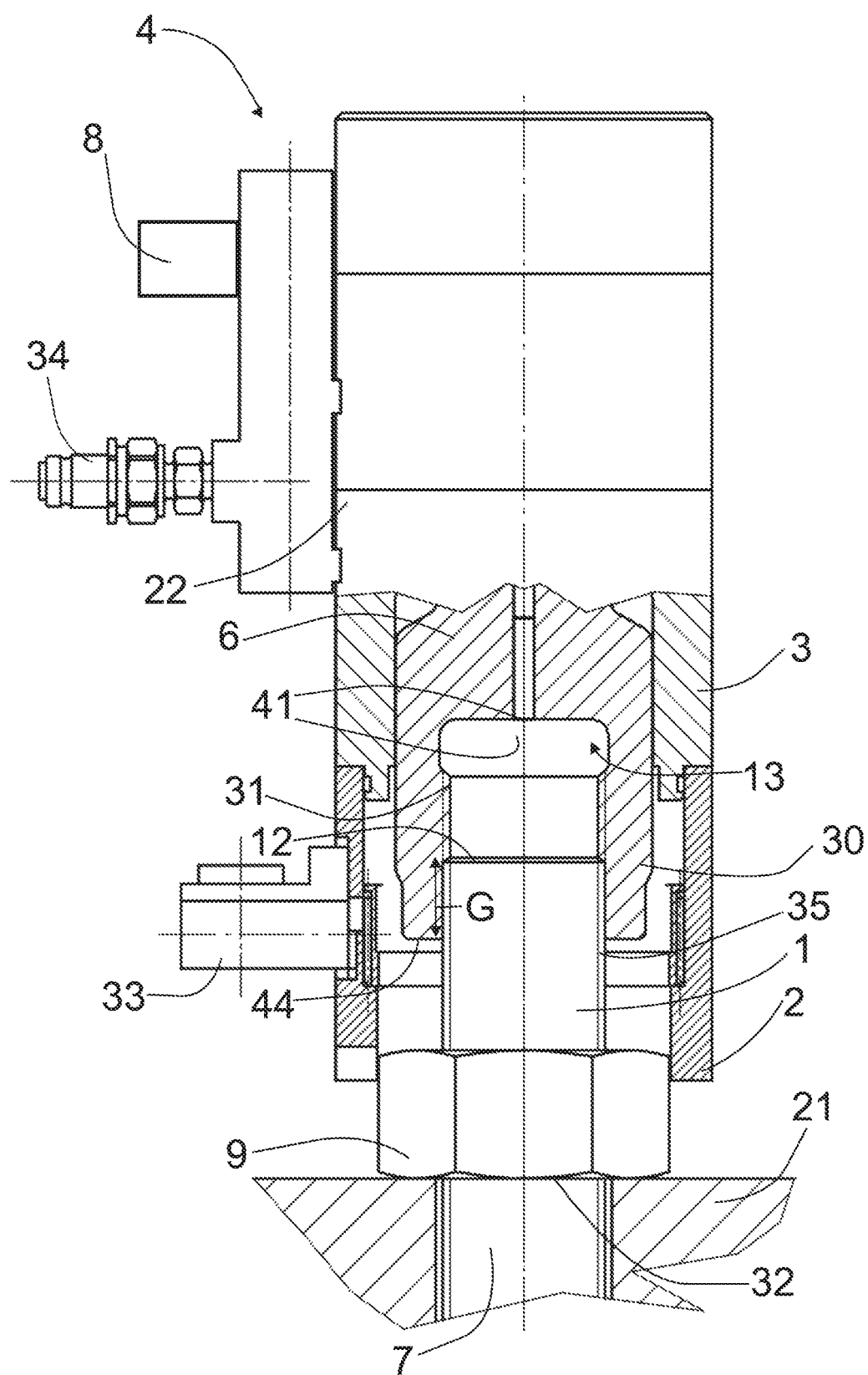
FIG. 3 shows the same clamping device according to the embodiments from FIG. 1 or 2 in an installation situation shortly before the clamping device has been placed completely onto the threaded bolt.

Before the beginning of the stretching or preloading process, the clamping device is placed onto a threaded end section 1 of the threaded bolt 7 extending beyond the nut 9. Such a situation shortly before the clamping device is completely installed is represented in FIG. 3. In this case, not only is the changeover bush 6 placed onto the threaded bolt 7, but so is the cylinder housing 22 and support tube 2 which surround the changeover bush 6.

The cylinder housing 22 surrounds one or multiple cylinders together with one or multiple pistons which are axially movable within the cylinder (not shown). The piston or pistons is/are designed such that the changeover bush 6 is carried along axially by at least one piston.

The cylinder housing 22 can be composed of multiple cylinder sections which are disposed in vertical alignment with each other. The cylinder housing 22, including a support tube 2 surrounding the nut 9, continues in the direction of the nut 9. The support tube 2 can be a one-piece component of the cylinder housing 22 or is fastened on the cylinder housing 22 using known means. The support tube 2 is open on the underside, as is also the case with the changeover bush 6 surrounding the support tube 2.

In the installation positions according to FIGS. 1 and 2, i.e., in the operating position for tightening the threaded bolt 7, the support tube 2 bears against the mating surface surrounding the nut 9. Such a mating surface can be a machine part 21, for example. The mating surface is used as an abutment for the clamping device during the stretching of the threaded bolt 7. The nut 9 to be tightened also bears against this mating surface via its underside 32.

A gearbox 33 can also be provided, which operates through a lateral opening in the support tube 2 and by means of which the nut 9 can be rotated, i.e., re-tightened. This rotation is only possible in the state, however, in which the threaded bolt 7 is under tension and, therefore, the nut 9 is relieved of tension.

A hydraulic device 4 is located outside the cylinder housing 22. Via this hydraulic device, one or multiple hollow spaces within a cylinder 3, which guides at least one piston in an axially movable manner, is/are filled or supplied with pressurized hydraulic fluid. The hydraulic device 4 is connected via a valve 34 to an external hydraulic supply system.

When the clamping device is placed onto the threaded bolt 7, the internal thread 31 of the sleeve-type section 30 of the changeover bush 6 engages into the external thread 35 of the threaded end section 1 of the threaded bolt 7. For this purpose, the changeover bush 6 is screwed onto the threaded bolt 7 until the desired thread engagement G or minimum thread engagement G1 between the internal thread 31 of the changeover bush 6 and the external thread 35 of the threaded bolt 7 has been achieved.

The piston is lifted by feeding hydraulic fluid through the hydraulic device 4 into the at least one hollow space of the cylinder 3. This cylinder carries the changeover bush 6 along in the axial direction in this case. The tensile force on the threaded bolt 7 is transmitted by means of the thread engagement G between the changeover bush 6 and the threaded bolt 7, and this threaded bolt is axially preloaded or stretched. The nut 9 can then be re-tightened in an approximately resistance-free manner.

In the embodiment according to FIG. 1, the clamping device is additionally provided with a device for detecting the length of the thread engagement G between the changeover bush 6 and the threaded end section 1 of the threaded bolt 7. This device includes a sensor element 11 fastened on the changeover bush 6. The sensor element 11 is not in contact with the end face 12 of the threaded bolt 7, and is therefore positioned contactlessly opposite this threaded bolt, with spacing therefrom, in every operating situation.

The sensor element 11 is disposed within the changeover bush 6, which is open toward the bottom, i.e., within the sleeve-type section 30 of the changeover bush 6.

An arrangement in alignment with the end face 12 of the threaded bolt 7 is preferable. In this case, the sensor element 11 and the end face of the threaded bolt 7 are disposed directly opposite each other.

In one preferred embodiment, the sensor element 11 is disposed in a longitudinal channel 14 extending in the changeover bush 6. This longitudinal channel is located precisely on the central axis of the changeover bush in this case, although it can also be offset therefrom.

The sensor element 11 closes the longitudinal channel 14 toward the bottom, in the direction of the threaded bolt 7. In this case, the underside 41 of the sensor element 11 is flush with the end face 42 of the changeover bush 6, which is disposed opposite the end face 12 of the threaded bolt 7.

The sensor element 11 is designed for sensing or measuring the distance A of the sensor element 11 from the end face 12 of the threaded bolt 7. For this purpose, the sensor element 11 can be an optical, acoustic, magnetic, electrical, electromagnetic, optoelectrical, inductive, low-frequency or high-frequency sensor. Other sensors that are suitable for contactless distance measurements can also be utilized as the sensor element 11. It is also possible to combine multiple sensors. Multiple sensor elements 11 of one sensor type can be disposed in parallel, for example. This can reduce the error tolerance of the measurement, for example.

The distance values A registered by the at least one sensor element 11 are forwarded in the form of signals to a hydraulic control unit 8 of the hydraulic device 4. For this purpose, the sensor element 11 can be connected to a cable which extends in the longitudinal channel 14 up to the upper part of the clamping device and, outside the clamping device, is routed further up to the hydraulic control unit 8 or to the hydraulic device. The measured distance values A are forwarded in the form of signals to the hydraulic control unit 8 via the cable.

It is also conceivable that information in the form of signals, in particular commands for controlling the sensor element 11, are sent via radio transmission from the hydraulic control unit 8 to the sensor element 11 and are received by the sensor element 11. The sensor element 11 and the hydraulic control unit 8 act both in the receiving mode and in the transmission mode with respect to signals.

The transmission and reception of the signals or the signal-based communication between the sensor element 11 and the hydraulic control unit 8 can also take place wirelessly via the wireless transmission paths known from the prior art. For example, the signal-based communication can take place via radio, WLAN, Bluetooth, or via electromagnetic systems such as transponders.

The thread engagement G between the changeover bush 6 and the threaded bolt 7 can be calculated from the measured distance A between the sensor element 11 and the end face 12 of the threaded bolt 7.

For this purpose, the distance F1 between the underside 41 of the sensor element 11 and the lower end 44 of the changeover bush 6 must be known. This results from the positionally fixed arrangement of the sensor element 11 and the size ratios of the clamping device and the changeover bush 6. The value can therefore be entered as a device-specific value after the installation of the sensor element 11 into a signal-based evaluation unit or data processing unit of the hydraulic control unit 8, as fixed variable F1. The variable F1 can be adjusted if the sensor element 11 is exchanged, of course.

The thread engagement G between the changeover bush 6 and the threaded bolt 7 results from the subtraction of the measured distance A between the sensor element 11 and the end face 12 of the threaded bolt 7 from the distance value F1 between the sensor element 11 and the lower end 44 of the changeover bush 6. The thread engagement G therefore results from $G=F1-A$.

The clamping device is designed in such a way that the hydraulic device 4 is first released at a minimum thread engagement G1 predefined by the user or by the manufacturer. If this minimum thread engagement is not present, the hydraulic unit blocks. The hydraulic control unit 8 therefore releases the hydraulic device 4 only for values of the thread engagement $G>G1$.

It is therefore possible to pump hydraulic fluid into the at least one hollow space in the at least one cylinder 3 only when the thread engagement G is sufficiently great. In addition, the threaded bolt 7 is therefore stretched only once a minimum thread engagement G1 has been reached.

In the embodiment according to FIG. 2, the sensor element 11 protrudes in the direction of the threaded bolt 7 with respect to the end face 42 of the changeover bush 6 or the channel 14 extending through the changeover bush 6. This results in a distance value F2 which deviates from the distance value F1 between the sensor element 11 and the end face 42 of the changeover bush 6 from the first embodiment. The reason therefor is that the sensor element 11 is spaced apart from the threaded bolt 7, but is spatially closer thereto than in the first embodiment. The thread engagement G is calculated from the distance value F2 and the measured distance A according to $G=F2-A$.

The hydraulic control unit 8 is further provided with visual means for data display and data input. These are connected to the electronics of the clamping device. This enables the user of the clamping device to predefine certain values required for the calculation of the thread engagement G or the preload, via data input. Such values can be the distance values F1, F2, the setpoint preload, or any further parameters. The values can be forwarded to the hydraulic control unit 8 via the visual means or other means for data display or data intput. For this purpose, the visual means in the form of a touchscreen or a data display can be provided with a separate key input.

In addition, the visual means display all relevant parameters or measured values which are significant for a reliable operation of the clamping device. For example, the visual means display the present thread engagement G and the minimum thread engagement length G1. Or, there is a visual display indicating whether the thread engagement achieved is sufficient or not. The display does not need to be limited to such parameters, however.

After the clamping device has been placed onto the threaded bolt 7 to be stretched (FIG. 3), the support tube 2 bears against a machine part 21 as an abutment (FIGS. 1, 2). The changeover bush 6 is screwed, via its internal thread 31, onto the external thread 35 of the threaded bolt 7 to be clamped. The screwing-on can take place manually or mechanically. The sensor element 11 continuously measures the distance value F1, F2 and forwards this to the hydraulic control unit 8. As soon as the minimum thread engagement length G1, which was predefined internal to the device and which corresponds to the safety requirements for reliable handling, has been reached, the hydraulic control unit 8 communicates this to the user via visual or acoustic means. This can take place, for example, by means of an acoustic signal or via flashing of visual means. Only then is the hydraulic supply released via the hydraulic control unit and only then can the operator start the hydraulic supply via an activation button. Alternatively, the hydraulic control unit 8 can start the hydraulic supply via the hydraulic device 4 automatically, i.e., without manual activation by the user.

After the activation, hydraulic fluid is conveyed into the hollow spaces in the piston-cylinder unit and the pistons are displaced in the vertical direction. These pistons carry the changeover bush 6 along, whereby the threaded bolt 7 is vertically drawn or stretched. Subsequent thereto, the nut 9 can be re-tightened, for example, via a gearbox 33 or manually.

Moreover, the clamping device can be connected to a measuring pin which is in contact with the end face 12 of the threaded bolt 7 and is known from the prior art. This measuring pin can be guided through the same channel 14 in which the sensor element 11 is also disposed. An arrangement comprising a second channel, which extends in parallel to the first channel 14, for guiding the measuring pin is also possible. The measuring pin is axially displaceable with respect to the changeover bush 6. The measuring pin is used for measuring the preload or as a reference method for determining the thread engagement G.

The specification incorporates by reference the entire disclosure of German priority document 10 2016 113 196.2 having a filing date of Jul. 18, 2016, of which the instant application claims priority.

While specific embodiments of the invention have been shown and described in detail to illustrate the inventive principles, it will be understood that the invention may be embodied otherwise without departing from such principles.

LIST OF REFERENCE NUMBERS 1 threaded end section
2 support tube
3 cylinder
4 hydraulic device
6 changeover bush
7 threaded bolt
8 hydraulic control unit
9 nut
11 sensor element
12 end face
13 inner side
14 longitudinal channel
16 sensor housing
21 machine part
22 cylinder housing
30 sleeve-type section
31 internal thread
32 underside
33 gearbox
34 valve
35 external thread
41 underside
42 end face
44 lower end
A measured distance
G thread engagement
G1 minimum thread engagement length
F1 distance value
F2 distance value

What is claimed is:

1. A clamping device for stretching a threaded bolt by pulling on its threaded end section, comprising a support tube (2) surrounding the threaded end section (1), a cylinder (3) which is disposed in extension of the support tube (2) and comprises at least one piston which is axially movable therein by means of hydraulic forces, a changeover bush (6) comprising a thread engaging end (30) which can be screwed together with the threaded end section (1), wherein the changeover bush (6) is designed to be carried along axially by the piston engaging an end of the changeover bush (6) remote from the thread engaging end (30), a hydraulic device (4) for the hydraulic supply of the piston, and a signal link between the hydraulic device (4) and a device for detecting the extent of the thread engagement (G) between the thread engaging end of the changeover bush (6) and the threaded end section (1), wherein the device for detecting the extent of the thread engagement (G) includes a sensor element (11), wherein the sensor element (11) is fixedly fastened to the thread engaging end (30) of the changeover bush (6) in a fixed axial position at a fixed axial distance relative to a lower end (44) of the thread engaging end (30) of the changeover bush (6) so as to move jointly with the changeover bush (6), wherein the sensor element (11) is positioned to immediately axially face the end face (12) of the threaded bolt (7) and is axially spaced apart from the end face (12) of the threaded bolt (7).

2. The clamping device as claimed in claim 1, wherein the sensor element (11) is an optical, acoustic, magnetic, electrical, electromagnetic, optoelectrical, inductive, low-frequency or high-frequency sensor.

3. The clamping device as claimed in claim 1, wherein the sensor element (11) is disposed on an inner side (13) of the thread engaging end of the changeover bush (6), which is axially facing the end face (12) of the threaded bolt (7).

4. The clamping device as claimed in claim 1, wherein the sensor element (11) is connected to a hydraulic control unit (8) of the hydraulic device (4) via the signal link.

5. The clamping device as claimed in claim 1, wherein the sensor element (11) is connected to the hydraulic control unit (8) of the hydraulic device (4) via a wireless or wired signal link.

6. The clamping device as claimed in claim 4, wherein the sensor element (11) is connected to the hydraulic control unit (8) via a signal cable extending through a longitudinal channel (14) of the changeover bush (6).

7. The clamping device as claimed in claim 1, wherein the hydraulic control unit (8) is designed for releasing the hydraulic device (4) only once a minimum thread engagement length (G1) has been reached.

8. The clamping device as claimed in claim 1, wherein the sensor element (11) is disposed on a sensor housing (16) which is provided with a threaded projection and, via this threaded projection, is screwed into a corresponding threaded receptacle of the changeover bush.

9. The clamping device as claimed in claim 1, wherein the hydraulic device (4) is provided with visual means for data display.

10. The clamping device as claimed in claim 9, wherein the visual means display the measured thread engagement (G) and a minimum thread engagement (G1).

11. The clamping device as claimed in claim 1, wherein an axially movable measuring pin, which is in contact with the end face (12) of the threaded bolt (7), is disposed next to the sensor element (11) fastened on the changeover bush (6).

12. The clamping device as claimed in claim 11, wherein the changeover bush (6) and the measuring pin are axially displaceable relative to each other.

13. The clamping device as claimed in claim 1, wherein the sensor element is positioned directly opposite the end face of the threaded bolt and measures contactless a distance from the sensor element to the end face of the treaded bolt.

* * * * *